US012781860B2

(12) United States Patent
Freter

(10) Patent No.: US 12,781,860 B2
(45) Date of Patent: Nov. 3, 2026

(54) VALVE FOR CONTROLLING A FLUID, VALVE STACK AND VALVE SYSTEM

(71) Applicant: A. Kayser Automotive Systems GmbH, Einbeck (DE)

(72) Inventor: Heiko Freter, Einbeck (DE)

(73) Assignee: A. Kayser Automotive Systems GmbH, Einbeck (DE)

( * ) Notice: Subject to any disclaimer, the term of this patent is extended or adjusted under 35 U.S.C. 154(b) by 22 days.

(21) Appl. No.: 18/984,763

(22) Filed: Dec. 17, 2024

(65) Prior Publication Data

US 2025/0207671 A1 Jun. 26, 2025

(30) Foreign Application Priority Data

Dec. 20, 2023 (DE) ......................... 102023135914.2

(51) Int. Cl.
*F16K 11/044* (2006.01)
*F16K 31/02* (2006.01)

(52) U.S. Cl.
CPC ............ *F16K 11/044* (2013.01); *F16K 31/02* (2013.01)

(58) Field of Classification Search
CPC ....... F16K 11/044; F16K 31/02; F16K 31/025
See application file for complete search history.

(56) References Cited

U.S. PATENT DOCUMENTS 2,658,523 A * 11/1953 Johnson .................. F15B 13/02 251/118
5,211,371 A * 5/1993 Coffee .................. F16K 31/025 60/527
9,810,340 B2 * 11/2017 Kraus ........................ F02K 9/58
10,753,494 B2 * 8/2020 Beuschel .............. F16K 11/052

FOREIGN PATENT DOCUMENTS

DE 10 2012 223 602 A1 6/2013
DE 10 2017 116 840 A1 1/2019
DE 10 2018 216 375 A1 3/2019
DE 102021005255 A1 4/2023

* cited by examiner

*Primary Examiner* — Daphne M Barry
(74) *Attorney, Agent, or Firm* — HONIGMAN LLP; Andrew J. Boes; Jonathan P. O'Brien

(57) ABSTRACT

A valve for controlling a fluid includes a valve housing having a primary chamber, a secondary chamber and a tertiary chamber, a first connection opening, a second connection opening. A primary port opening, secondary port opening, and a tertiary port opening is formed corresponding a primary, secondary and tertiary chamber. A primary sealing element is arranged in the valve housing. An urging element urges the primary sealing element towards the rest position. A shape memory element causes displacement of the primary sealing element from a rest position into an activated position. A secondary sealing element is arranged in the valve housing, wherein the secondary sealing element is mechanically coupled to the sealing element such that upon displacement of the primary sealing element from the activated position into the rest position, the secondary sealing element is displaced from a closed posture into an open posture.

10 Claims, 4 Drawing Sheets

VALVE FOR CONTROLLING A FLUID, VALVE STACK AND VALVE SYSTEM

CROSS-REFERENCE TO RELATED APPLICATIONS

This application claims priority of German Application DE 10 2023 135 914.2 filed on Dec. 20, 2023, the contents of which are incorporated herein.

TECHNICAL FIELD

The invention relates to a valve for controlling a fluid, a valve stack and a valve system.

BACKGROUND

Conventional solenoid valves for controlling a fluid, in particular compressed air, switch audibly and require a large installation space. For noise-sensitive applications such as, for example, inflating and deflating air cushions, in particular massage devices, valves are therefore often used which switch quietly by means of multiple shape memory wires and/or shape memory alloy (SMA) wires. Such a valve is disclosed, for example, in DE 10 2021 005 255 A1. However, such a valve may come with high costs and increased manufacturing effort. In addition, the large installation space caused by the multiple SMA wires is not desirable, since these valves are used, for example, in the rear seat back of a passenger car to control massage bladders of the seat, wherein only a small installation space is available.

SUMMARY

It is therefore an objective of the present invention to provide a valve operating with low noise which switches reliably and can be manufactured cost-effectively and compactly.

This objective is achieved by the subject-matters of the independent claims. Advantageous embodiments are defined in the dependent claims.

A first aspect of the invention relates to a valve for controlling a fluid, in particular compressed air, comprising: a valve housing comprising: a primary chamber (first chamber), a secondary chamber (second chamber) and a tertiary chamber (third chamber), wherein the primary chamber and the tertiary chamber are fluidically connected, in particular exclusively, by a first connection opening and wherein the secondary chamber and the tertiary chamber are fluidically connected, in particular exclusively, by a second connection opening; and a primary port opening formed in the primary chamber, a secondary port opening formed in the secondary chamber and a tertiary port opening formed in the tertiary chamber; a primary sealing element which is arranged displaceably in the valve housing, in particular at least in sections in the primary chamber, between a rest position in which the primary sealing element closes the first connection opening, and an activated position in which the primary sealing element releases/opens the first connection opening; a primary urging element and/or spring element which is coupled to the primary sealing element to urge the primary sealing element towards the rest position; a shape memory element which is coupled to the primary sealing element and the valve housing such that application of an electric current to the shape memory element causes displacement of the primary sealing element from the rest position into the activated position; and a secondary sealing element which is arranged displaceably in the valve housing, in particular at least in sections in the secondary chamber, between a closed posture and/or arrangement (closed posture in the foregoing) in which the secondary sealing element closes the second connection opening, and an open posture and/or arrangement (open posture in the foregoing) in which the secondary sealing element releases and/or opens the second connection opening; wherein the secondary sealing element is mechanically coupled to the primary sealing element such that upon displacement of the primary sealing element from the activated position into the rest position by the primary urging element, the secondary sealing element is also displaced from the closed posture into the open posture.

The valve is particularly advantageous since it has few components, in particular few actuators, and/or can be manufactured cost-effectively.

In particular, the valve may be equipped with only a single shape memory element which is coupled to the primary sealing element to displace both the primary sealing element and the secondary sealing element.

The primary port opening may be configured and/or provided to introduce a fluid, in particular a compressed air, into the primary chamber. In an exemplary application, the primary port opening may be connected to an air pump and/or a compressor and/or a compressed air tank for providing the compressed air, in particular connected via an air hose or an air pipe.

The secondary port opening may be configured and/or provided to discharge and/or conduct a fluid, in particular a compressed air, from and/or out of the secondary chamber. In an exemplary application, the secondary port opening may be fluidically connected to the environment and/or atmosphere, either directly or via an air hose or an air pipe. The primary port opening and the secondary port opening may also be configured in reverse, so that the primary port opening is connected to the environment and the secondary port opening is connected to the supply air.

The tertiary port opening may be configured and/or provided to selectively discharge a fluid, in particular a compressed air, from and/or out of the tertiary chamber or introduce it into the tertiary chamber. In an exemplary application, the tertiary port opening may be fluidically connected to an inflatable object such as, for example, an air cushion and/or balloon and/or a massage bladder, in particular of a vehicle seat, and/or a pneumatic actuator, in particular a pneumatic cylinder, in particular fluidically connected via an air hose or an air pipe.

In the rest position of the primary sealing element and the open posture of the secondary sealing element caused thereby, the second connection opening is preferably substantially opened and a fluid flow between the secondary chamber and the tertiary chamber through the second connection opening is enabled.

In the activated position of the primary sealing element and the closed posture of the secondary sealing element caused thereby, the first connection opening is preferably opened and a fluid flow between the primary chamber and the tertiary chamber through the first connection opening is enabled.

Displacement of the primary sealing element and/or the secondary sealing element effected in this or a similar manner offers advantageous fluid flow control. In particular, reciprocal and/or opposite closure of one of the first and second connection openings can be achieved in a simple and reliable manner.

In particular by the coupling between the primary sealing element and the secondary sealing element, reliable fluid flow control while reducing the number of actuators, in particular shape memory elements, for switching the valve is enabled, thereby reducing the complexity and/or cost of the valve.

The secondary sealing element may be substantially firmly connected or non-destructively and/or reversibly detachably coupled to the primary sealing element.

A firmly connected coupling between the sealing elements is advantageous, since both a tensile force and a compressive force can be transmitted from the primary sealing element to the secondary sealing element. Thereby, a substantially synchronous and/or uniform displacement of the primary sealing element and the secondary sealing element can be achieved by means of a single shape memory element.

The secondary sealing element may be substantially non-destructively and/or reversibly detachably coupled to the primary sealing element, in particular by means of a coupling element. In particular, the secondary sealing element may be decoupled and/or spaced apart from the primary sealing element when the primary sealing element is in the activated position. Alternatively or additionally, the primary sealing element may be decoupled and/or spaced apart from the coupling element in the activated position. Alternatively or additionally, the secondary sealing element may be decoupled and/or spaced apart from the coupling element when the primary sealing element is in the activated position. A non-destructive and/or reversibly detachable coupling between the sealing elements is advantageous, since the displacement of the primary sealing element into the activated position caused by the shape memory element can be effected independently of the displacement of the secondary sealing element into the closed posture. Thereby, operation of the valve is ensured even with larger production tolerances.

In particular, the secondary sealing element, in the closed posture, may be decoupled from the primary sealing element located in the activated position. For example, a displacement distance of the primary sealing element from the rest position to the activated position may thus be greater than a displacement distance of the secondary sealing element from the open posture to the closed posture, without preventing or impeding further displacement of the primary sealing element when reaching the closed posture of the secondary sealing element.

Despite decoupling of the secondary sealing element from the primary sealing element, displacement of the secondary sealing element into the closed posture and/or retention of the secondary sealing element in the closed posture can be reliably ensured, in particular by a force acting on the secondary sealing element from a secondary urging element described in more detail below. Thus, reliable fluid flow control is ensured even when the primary and secondary sealing elements are decoupled.

In particular, the primary urging element is configured to exert a force on the primary sealing element, wherein the force acts substantially in an opposite direction to a direction of displacement of the primary sealing element from the rest position into the activated position. Alternatively or additionally, the primary urging element may be configured to keep the primary sealing element substantially in the rest position and/or the first connection opening closed, in particular when no electric current is applied to the shape memory element. The primary urging element and/or the secondary urging element may be a spring element, in particular a coil spring.

The shape memory element is preferably configured and/or coupled to the valve housing and the primary sealing element such that upon application of an electric current and/or contraction of the shape memory element, the primary sealing element is displaced out of the rest position and into the activated position, counter to the force acting from the primary urging element.

In particular, the shape memory element may be directly or indirectly coupled and/or connected to a valve housing portion and/or a valve housing part. In particular, the shape memory element may be coupled and/or connected within the valve housing, preferably within the primary chamber, to the valve housing or to a portion of the valve housing forming the primary chamber directly, or indirectly via an intermediate component.

The valve housing may have a main body for receiving the displaceable components of the valve, and a valve cover which may be firmly or substantially non-destructively detachably connected to the main body, wherein the shape memory element may be directly or indirectly coupled and/or connected to the main body and/or to the valve cover.

In particular, the valve may have one or more intermediate components or connecting elements via which the shape memory element may be coupled and/or connected to the connecting housing.

In this or a similar manner, a simple and/or reliable temporary opening of the first connection opening by the primary sealing element can be achieved.

The primary sealing element may be arranged in the valve housing, in particular in the primary chamber, in a manner substantially linearly and/or translationally displaceable from the rest position into the activated position (and back). Thereby, a compact arrangement and/or mechanically simple displacement can be effected.

Alternatively or additionally, the secondary sealing element may be arranged in the valve housing, in particular in the secondary chamber, in a manner substantially linearly and/or translationally displaceable into the closed posture (and back). Thereby, a compact arrangement and/or mechanically simple displacement can be effected.

Preferably, the displacement directions of the primary sealing element and the secondary sealing element are oriented substantially coaxially or in parallel to each other. This enables a mechanically simple coupling between the primary sealing element and the secondary sealing element.

The first connection opening and the second connection opening may be arranged substantially on a common axis or on axes parallel to each other, particularly preferably on the common axis or the parallel axes of the displacement directions of the sealing elements. This is advantageous, since the displacement of the primary sealing element can thus be easily transmitted to the secondary sealing element, thereby enabling a simplified structure of the valve.

The primary urging element may, at least in sections, surround and/or be positioned coaxially with a primary guide pin for guiding the displacement of the primary sealing element. Thereby, a compact design size and an advantageous force impact in a substantially axial direction on the primary sealing element can be effected. In particular, the primary urging element may be a coil spring, for example, wherein the coil spring may, at least in sections, be arranged radially around the primary guide pin. The primary sealing element, the primary guide pin and/or the primary urging element may be arranged, in particular completely, in the primary chamber.

The valve may further have a secondary urging element and/or spring element which is coupled to the secondary sealing element to urge the secondary sealing element towards the closed posture. Thereby, the reliability of closing the second connection opening can be increased.

In particular, the secondary urging element may be configured to exert a force on the secondary sealing element, wherein the force acts substantially in the same direction or in parallel to a direction of displacement of the primary sealing element from the rest position into the activated position. Alternatively or additionally, the secondary urging element may be configured to keep the secondary sealing element substantially in the closed posture and/or the second connection opening closed, in particular when the primary sealing element is in the activated position and/or an electric current is applied to the shape memory element.

The secondary urging element may act substantially opposite and/or in the opposite direction to the primary urging element. In particular, the secondary urging element acts on the secondary sealing element with a lower force than the primary urging element acts on the primary sealing element. Stated differently, a force which acts on the primary sealing element from the primary urging element is greater than a force which acts on the secondary sealing element from the secondary urging element. This makes sure that the primary sealing element is urged into the rest position by the primary urging element, thereby urging the secondary sealing element into the open posture against the force of the secondary urging element when no current is applied to the shape memory element.

The secondary urging element may, at least in sections, surround and/or be positioned coaxially with a secondary guide pin for guiding the displacement of the secondary sealing element. Thereby, a compact design size and an advantageous force impact in a substantially axial direction on the secondary sealing element can be effected. In particular, the secondary urging element may be a coil spring, for example, wherein the coil spring may, at least in sections, be arranged radially around the secondary guide pin. The secondary sealing element, the secondary guide pin and/or the secondary urging element may be arranged, in particular completely, in the secondary chamber.

The valve may further have a coupling element for mechanically coupling the primary sealing element and the secondary sealing element.

The coupling element may in particular be configured to transmit substantially linear and/or translational displacement of the primary sealing element to the secondary sealing element. Preferably, the secondary sealing element is thereby also displaced substantially linearly and/or translationally, in particular substantially uniformly and/or synchronously with the primary sealing element.

Alternatively or additionally, the coupling element may be configured to transmit substantially linear and/or translational displacement of the secondary sealing element to the primary sealing element. Preferably, the primary sealing element is thereby also displaced substantially linearly and/or translationally, in particular substantially uniformly and/or synchronously with the secondary sealing element.

The coupling element may be connected to the secondary sealing element and/or to the primary sealing element. The coupling element may extend through the first and second connection openings, and in particular extend through the tertiary chamber.

The coupling element may be configured as a coupling pin of the primary sealing element. In other words, the coupling pin may be connected to the primary sealing element, in particular be formed integrally therewith. The coupling pin may be arranged in the valve housing in a manner passing through the first connection opening and through the second connection opening. Thereby, advantageous displacement of the secondary sealing element can be effected by displacing the primary sealing element. Preferably, by the coupling of the primary sealing element to the secondary sealing element by means of the coupling pin, substantially uniform displacement of the primary and secondary sealing elements is effected.

The coupling pin may be couplable, with its end face, to the secondary sealing element.

Alternatively, the coupling element may be configured as a coupling pin of the secondary sealing element. In other words, the coupling pin may be connected to the secondary sealing element, in particular be formed integrally therewith. The coupling pin may be arranged in the valve housing in a manner passing through the first connection opening and through the second connection opening.

The coupling pin may be couplable, with its end face, to the primary sealing element. Thereby, advantageous displacement of the secondary sealing element can be effected by displacing the primary sealing element. Preferably, by the coupling of the primary sealing element to the secondary sealing element by means of the coupling pin, substantially uniform displacement of the primary and secondary sealing elements is effected.

Alternatively, the primary sealing element and the secondary sealing element may each have a coupling pin, wherein the coupling pins are coupled to each other and, preferably, are each arranged in a manner passing through one of the first and second connection openings.

The first connection opening may be arranged in a first wall of the valve housing separating the primary chamber and the tertiary chamber. The second connection opening may be arranged in a second wall of the valve housing separating the secondary chamber and the tertiary chamber. Preferably, the first wall and the second wall are arranged substantially in parallel to each other and/or on opposite sides of the tertiary chamber.

The primary sealing element may be positioned at least partially, preferably largely or substantially completely, in the primary chamber and on a side of the first wall facing away from the second wall. The primary sealing element is preferably configured and arranged to close the first connection opening from inside the primary chamber. This enables easy assembly of the valve in particular. The primary sealing element may have a primary sealing rubber facing the first connection opening. The primary sealing rubber may be formed in an annular shape, wherein a coupling pin of the secondary sealing element may be configured to come into contact, with its end face, with the primary sealing element in the region of the free space inside the primary sealing rubber. The primary sealing rubber may have a soft material such as, for example, silicone or elastomer, in particular a thermoplastic elastomer (TPE), for example a thermoplastic vulcanizate (TPV).

The secondary sealing element may be positioned at least partially, preferably largely or substantially completely, in the secondary chamber and on a side of the second wall facing away from the first wall. The secondary sealing element is preferably configured and arranged to close the second connection opening from inside the secondary chamber. This enables easy assembly of the valve in particular. The secondary sealing element may have a secondary sealing rubber facing the second connection opening. The secondary sealing rubber may be formed in an annular shape, wherein a coupling pin of the primary sealing element may be configured to come into contact, with its end face, with the primary sealing element in the region of the free space inside the secondary sealing rubber. Alternatively, a coupling pin of the secondary sealing element may be connected to the secondary sealing element in the region of the free space of the secondary sealing rubber to extend therefrom towards the primary sealing element. A reverse configuration is also conceivable. The secondary sealing rubber may have a soft material such as, for example, silicone or elastomer, in particular a thermoplastic elastomer (TPE), for example a thermoplastic vulcanizate (TPV).

The shape memory element may have a wire having or consisting substantially of a shape memory alloy. The shape memory element may in particular be configured to contract and/or shorten upon application of an electric current in such a way as to displace the primary sealing element from the rest position into the activated position, in particular against the force acting from the primary urging element.

The valve may further have two or more contact means for contacting the shape memory element and/or applying an electric voltage and/or an electric current, in particular at substantially opposite end portions of the shape memory element.

The contact means are preferably contactable from outside the valve housing. A contact means may, for example, have or be a plug and/or screw and/or crimp connection.

The valve may further have a control board for actuating the shape memory element, which is arranged within the valve housing or externally on the valve housing. Optionally, the valve has a cover to conceal and/or cover the control board.

A second aspect of the invention relates to a valve stack comprising two or more interconnected valves according to the first aspect of the invention.

Here, the valve stack may have an outer housing which comprises two or more valves and/or which forms the valve housings of two or more valves. In other words, the valve housings of the two or more valves of the valve stack may be formed substantially integrally and/or in one piece. Thereby, a smaller space requirement and simplified attachment can be achieved compared to individual and/or separate valves.

Preferably, the two or more valves are substantially identically configured, in particular with regard to a fluid flow rate. This reduces costs due to the higher number of components compared to different valves with different components.

The valve stack may have a supply air external port which is connected to multiple, preferably all, primary or secondary port openings of the valves. Alternatively or additionally, the valve stack may have an exhaust air external port which is connected to multiple, preferably all, primary or secondary port openings. Thereby, the number of fluid ports can be reduced and/or a substantially identical fluid flow through multiple, preferably all, valves can be achieved.

The valve stack may have master contact means which are connected to the contact means of multiple valves. Thereby, the number of electrical connections can be reduced and/or substantially identical actuation of multiple valves can be achieved.

Alternatively or additionally, the valve stack may be configured such that two or more tertiary port openings of different valves are combined to form a combination port so that a fluid flow through the combination port is greater than through a single tertiary port opening. Thereby, a larger fluid volume per switching time and/or a larger fluid flow rate can be achieved, in particular if the valves of the valve stack are substantially identically configured.

A third aspect of the invention relates to a valve system comprising: one or more valves according to the first aspect of the invention; and an external valve which is fluidically connected to the primary port opening or to the secondary port opening of the one valve or to the primary port openings or to the secondary port openings of the multiple valves and is configured to control, in particular temporarily substantially prevent, a fluid flow through the fluidically connected port opening of the one valve or fluid flows through the fluidically connected port openings of the multiple valves.

The external valve may in particular be configured to maintain a pressure in an inflatable object fluidically connected to the one valve or to maintain the pressures in a plurality of inflatable objects each fluidically connected to one of the valves when the secondary sealing element of the one valve is in the open posture or when the secondary sealing elements of the multiple valves are in the open posture.

In particular, a valve system may have two or more valves according to the first aspect of the invention and/or a valve stack according to the second aspect of the invention; and an external valve which is fluidically connected to the primary port openings or to the secondary port openings of the two or more valves and is configured to control a fluid flow through these port openings. Thereby, the function of the two or more valves can be extended to include pressure maintenance and at the same time the number of valves required for this can be reduced, since only a single external valve needs to be provided for a plurality of valves. In particular, the function of substantially synchronous and/or substantially uniform discharge of the fluids from the plurality of inflatable objects each fluidically connected to one of the valves can thereby be achieved.

In particular, the external valve may be fluidically connected to each of the primary port openings of the valves and/or may be provided to maintain a pressure in the primary chambers and/or to prevent a discharge of fluids from the primary chambers of the valves, in particular when the primary sealing element is in the activated position and/or the secondary sealing element is in the closed posture.

Alternatively, the external valve may be fluidically connected to each of the secondary port openings of the valves and/or may be provided to maintain a pressure in the secondary chambers and/or to prevent a discharge of fluids from the secondary chambers of the valves, in particular when the primary sealing element is in the rest position and/or the secondary sealing element is in the open posture.

The external valve may be formed integrally with one or more valves, in particular with a valve stack comprising two or more valves, or may be provided separately.

In the following, individual embodiments for achieving the object are described by way of example with reference to the figures. In some cases, the individual embodiments described have features which are not absolutely necessary to carry out the claimed subject matter, but which provide desired properties in certain applications. Thus, embodiments which do not have all the features of the embodiments described below are also to be regarded as disclosed falling within the scope of the technical teaching described. Furthermore, in order to avoid unnecessary repetitions, certain features are mentioned only in relation to individual embodiments described below. It should be noted that the individual embodiments are therefore to be considered not only in isolation but also in combination. Based on this combination, a person skilled in the art will recognize that individual embodiments can also be modified by incorporating individual or several features of other embodiments. It should be noted that a systematic combination of the individual embodiments with individual or several features described in relation to other embodiments may be desirable and useful and is therefore to be taken into consideration and also to be regarded as included in the description.

DETAILED DESCRIPTION OF PREFERRED EMBODIMENTS

Figure 1:
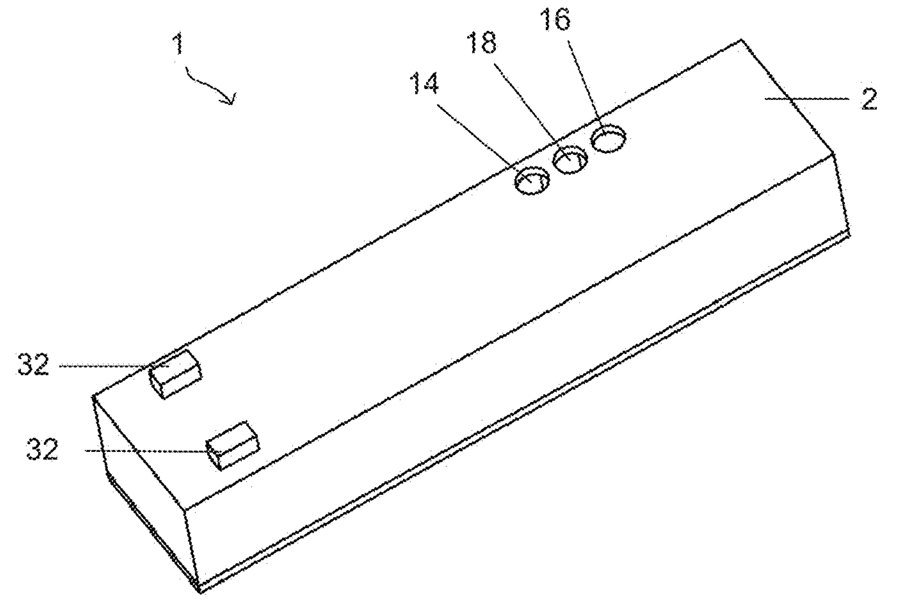
FIG. 1 shows an external view of an exemplary valve.

FIG. 1 shows an external view of an exemplary valve 1 having a valve housing 2. The valve housing 2 has a primary port opening 14, a secondary port opening 16 and a tertiary port opening 18 for introducing a fluid into the valve housing 2 and/or for conducting a fluid out of the valve housing 2. In the example shown, the tertiary port opening 18 is positioned between the primary port opening 14 and the secondary port opening 16.

Furthermore, there are shown two contact means 32 for electrically contacting a shape memory element 30 arranged within the valve housing 2 from outside the valve housing 2.

Figure 2:
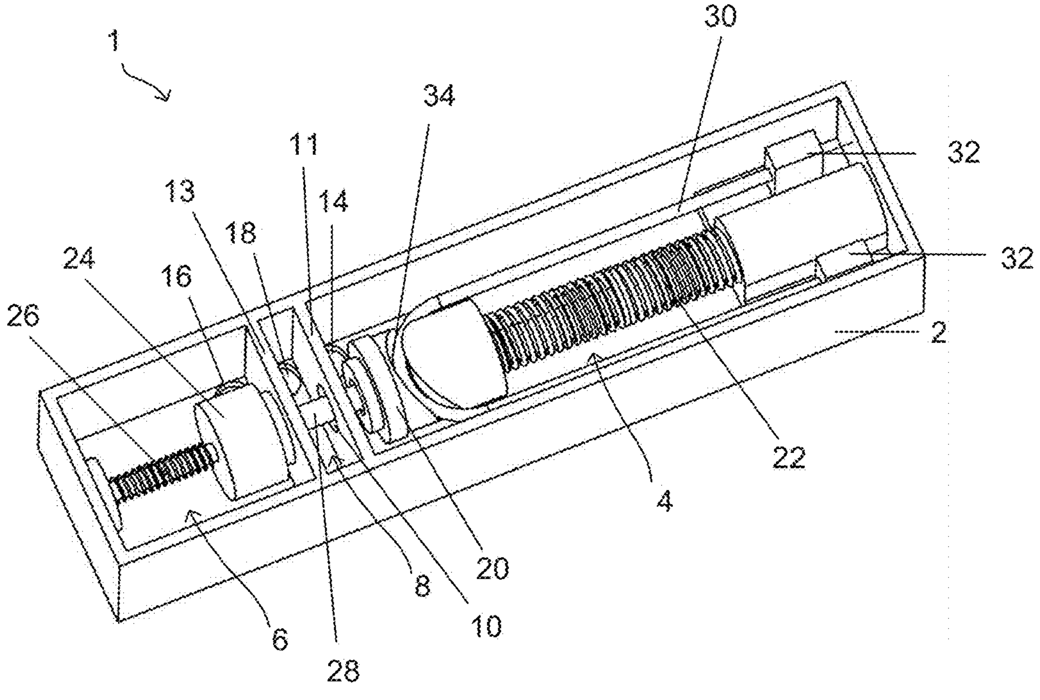
FIG. 2 shows an internal view of the exemplary valve of FIG. 1.

FIG. 2 shows an internal view of the exemplary valve 1 of FIG. 1, wherein the valve 1 in FIG. 2 is shown substantially rotated by 180° compared to FIG. 1.

The valve housing 2 has a primary chamber 4, a secondary chamber 6 and a tertiary chamber 8. In the example shown, the tertiary chamber 8 is arranged between the primary chamber 4 and the secondary chamber 6.

The primary port opening 14 is arranged in the valve housing 2 so as to enable a fluid flow between the outside of the valve housing 2 and the primary chamber 4. The primary port opening 14 may, for example, have a hydraulic and/or pneumatic port, in particular a plug connector, which is couplable to a fluid line.

The secondary port opening 16 is arranged in the valve housing 2 so as to enable a fluid flow between the outside of the valve housing 2 and the secondary chamber 6. The secondary port opening 16 may, for example, have a hydraulic and/or pneumatic port, in particular a plug connector, which is couplable to a fluid line.

The tertiary port opening 18 is arranged in the valve housing 2 so as to enable a fluid flow between the outside of the valve housing 2 and the tertiary chamber 8. The tertiary port opening 18 may, for example, have a hydraulic and/or pneumatic port, in particular a plug connector, which is couplable to a fluid line.

In the example shown, the tertiary port opening 18 is in particular provided to be fluidically coupled to an inflatable object 54, for example an air cushion and/or a balloon and/or a massage bladder and/or a pneumatic cylinder.

A first wall 11 separates the primary chamber 4 from the tertiary chamber 8. A second wall 13 separates the secondary chamber 6 from the tertiary chamber 8. The first wall 11 and the second wall 13 are preferably arranged substantially in parallel to and/or opposite each other.

In the first wall 11, a first connection opening 10 is provided which fluidically connects the primary chamber 4 and the tertiary chamber 8. In the second wall 13, a second connection opening 12 is provided which fluidically connects the secondary chamber 6 and the tertiary chamber 8.

The valve 1 further has a primary sealing element 20 which is preferably arranged completely in the valve housing 2. Preferably, the primary sealing element 20 is arranged substantially completely in the primary chamber 4.

The primary sealing element 20 is arranged displaceably in the valve housing 2, in particular in the primary chamber 4, between a rest position and an activated position and is configured to close the first connection opening 10 in a substantially fluid-tight manner in the rest position and to open and/or not to close the first connection opening 10 in the activated position. In the activated position of the primary sealing element 20, a fluid flow can take place between the primary chamber 4 and the tertiary chamber 8 through the first connection opening 10.

The valve 1 further has a secondary sealing element 24 which is preferably arranged completely in the valve housing 2. Preferably, the secondary sealing element 24 is arranged substantially completely in the secondary chamber 6.

The secondary sealing element 24 is arranged displaceably between an open posture and a closed posture in the valve housing 2, in particular in the secondary chamber 6, and is configured to close the second connection opening 12 in a substantially fluid-tight manner in the closed posture and to open and/or not to close the second connection opening 12 in the open posture. In the open posture of the secondary sealing element 24, a fluid flow can take place between the secondary chamber 6 and the tertiary chamber 8 through the first connection opening 12.

Figure 3:
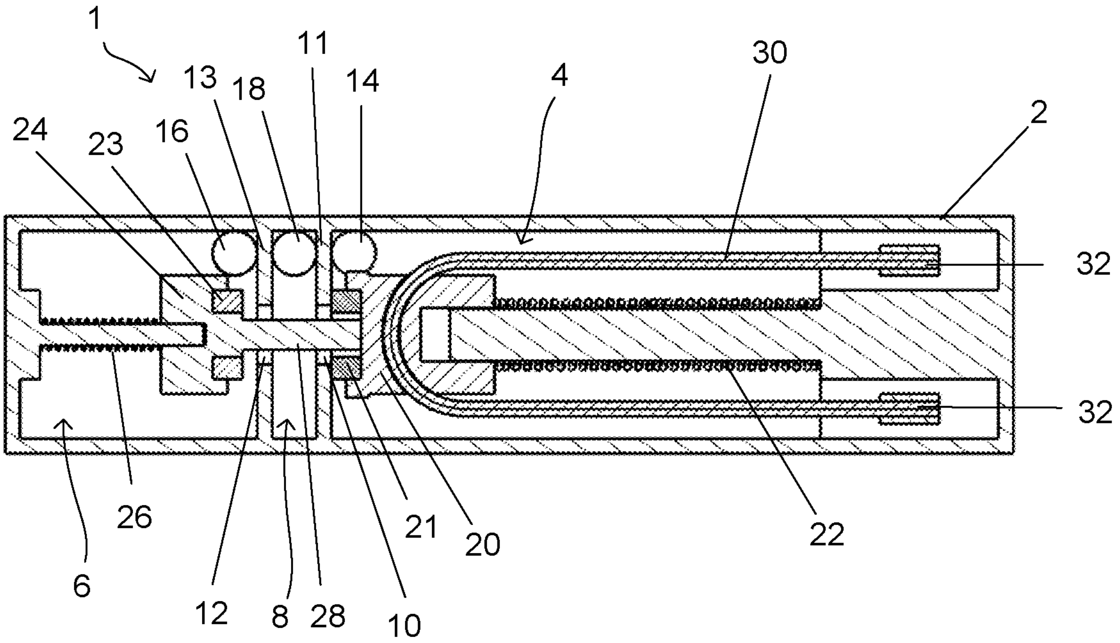
FIG. 3 shows a sectional view of the exemplary valve of FIG. 1 with the primary sealing element in the rest position.

FIG. 3 shows a sectional view of the exemplary valve 1 of FIGS. 1 and 2 with the primary sealing element 20 in the rest position and the secondary sealing element 24 in the open posture.

The primary sealing element 20 abuts, with its head 21 which may optionally have an elastic element or sealing rubber, against the first wall 11 around the first connection opening 10 and closes the first connection opening 10 in a substantially fluid-tight manner. The first wall 10 may act as a sealing seat for the primary sealing element 20.

The valve 1 preferably has a primary urging element 22 which urges the primary sealing element 20 into the rest position and/or retains it in the rest position.

In the example shown, the primary urging element 22 comprises a spiral spring which is coupled to the valve housing 2 and the primary sealing element 20 in such a way as to act with a force on the primary urging element 22, wherein the force displaces the primary sealing element 20 towards the first wall 11 and/or presses it against the first wall 11. A spiral spring which is arranged around the primary sealing element 20 enables a particularly compact configuration of the valve 1.

The primary urging element 22 may alternatively or additionally have a leg spring and/or Belleville spring and/or bending spring and/or another metallic or non-metallic spring element.

The valve 1 has a shape memory element 30 which is coupled to the valve housing 2 and the primary sealing element 20 such that upon application of an electric current to the shape memory element 30, the primary sealing element 20 is displaced relative to the valve housing 2. In particular, the shape memory element 30 is configured to displace the primary sealing element 20 from the rest position to an activated position, as shown, for example, in FIG. 4.

In the rest position shown in FIG. 3, the shape memory element 30 is in a normal state, in particular in a non-shortened and/or non-contracted state. Preferably, substantially no force acts on the primary sealing element 20 from the shape memory element 30.

In the rest position, substantially no fluid flow is allowed between the primary chamber 4 and the tertiary chamber 8 through the first connection opening 10. For example, a pressure applied to the primary port opening 14 of the primary chamber 4 is not transmitted to the tertiary chamber 8 and/or to an inflatable object 54 connected to the tertiary port opening 18.

As shown in FIG. 3, the secondary sealing element 24 is in the open posture in which the second connection opening 12 is substantially open and/or not closed. Therefore, in the rest position of the primary sealing element 20, a fluid flow between the secondary chamber 6 and the tertiary chamber 8 through the second connection opening 12 is preferably allowed. For example, a pressure applied to the secondary port opening 16 of the secondary chamber 6 is transmitted to the tertiary chamber 8 and/or to an inflatable object 54 connected to the tertiary port opening 18. In particular, a fluid can escape from the inflatable object 54 via the tertiary chamber 8 and the secondary chamber 6.

Preferably, the secondary sealing element 24 is coupled and/or firmly connected to the primary sealing element 20 by means of a coupling element 28 such that the secondary sealing element 24 is urged into the open posture or is retained in the open posture by the primary sealing element 20 when the primary sealing element 20 displaces towards the rest position or is in the rest position.

For this purpose, for example, the secondary sealing element 24 may have a coupling pin 28 which extends towards the primary sealing element 20 and is coupled and/or firmly connected thereto at the end face.

Alternatively, the primary sealing element 20 may have a coupling pin 28 which extends towards the secondary sealing element 24 and is coupled and/or firmly connected thereto at the end face.

Further alternatively, both sealing elements 20, 24 may each have a coupling pin 28 which are coupled and/or firmly connected to each other.

By the coupling by means of the coupling pin 28, displacement of the primary sealing element 20 can be transmitted substantially directly to the secondary coupling element 24, so that the primary sealing element 20 and the secondary sealing element 24 can be displaced substantially uniformly and/or synchronously by the shape memory element 30.

This is particularly advantageous, since it achieves reciprocal and coordinated closing and opening of the first connection opening 10 and the second connection opening 12.

Furthermore, this is advantageous since the secondary sealing element 24 can thus be displaced by the shape memory element 30 coupled to the primary sealing element 20. Thereby, no additional shape memory element 30 needs to be provided for displacing the secondary sealing element 24.

The coupling pin 28 may in particular extend between the primary chamber 4 and the secondary chamber 6 and/or be arranged in sections in the first connection opening 10 and/or in sections in the second connection opening 12. Preferably, the coupling pin 28 extends from the secondary chamber 8 through the second connection opening 10 and through the first connection opening 12 into the primary chamber 4, preferably both in the rest position/open posture and in the activated position/closed posture.

Figure 4:
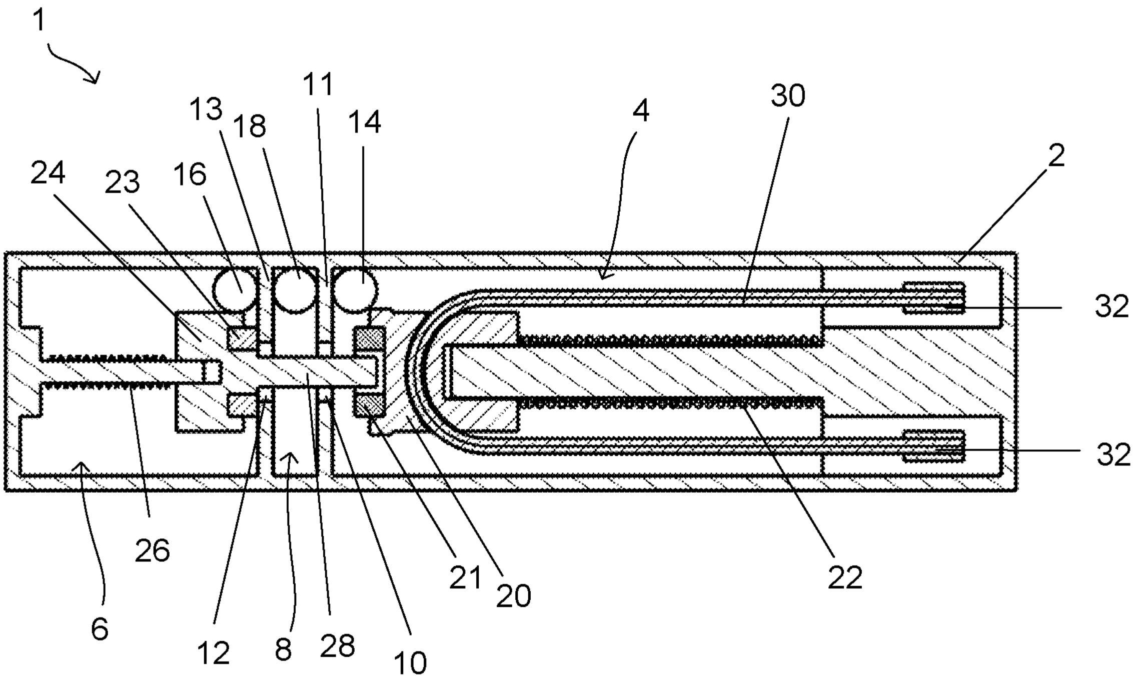
FIG. 4 shows a sectional view of the exemplary valve of FIG. 1 with the primary sealing element in the activated position.

FIG. 4 shows a sectional view of the exemplary valve 1 of FIGS. 1 and 2 with the primary sealing element 20 in the activated position and the secondary sealing element 24 in the closed posture.

Contrary to the rest position, the primary sealing element 20 does not abut with its head 21 against the first wall 11 and/or does not close the first connection opening 10. The first connection opening 10 is opened when the primary sealing element 20 is in the activated position.

In FIG. 4, an electric current and/or an electric voltage is applied to the shape memory element 30, causing it to shorten and/or contract and to displace the primary sealing element 20 into the activated position.

The shape memory element 30 is in particular configured to displace the primary sealing element 30 from the rest position and against the force acting from the primary urging element 22. Advantageous designs and properties of the shape memory element 30 are described below.

An advantageous shape memory element 30 may comprise an SMA wire which is connected, with its ends, to the valve housing 2 at an end region of the primary chamber 4. Preferably, the SMA wire is arranged substantially U-shaped in the primary chamber 4, wherein a central region of the SMA wire forms an arc and is positioned at a region of the primary chamber 4 near the first wall 11.

Such an or a similarly configured and/or positioned SMA wire can be manufactured cost-effectively, easily installed and has a sufficiently large contracting distance to displace the primary sealing element 20 for switching the valve 1.

Preferably, the shape memory element 30 is directly coupled to the primary sealing element 20 with a coupling groove 34 of the latter, thereby achieving reduced assembly effort. Thereby, the stroke generated by the shape memory element 30 is transmitted directly and/or substantially loss-free to the primary sealing element 20. Preferably, the shape memory element 30 is not coupled to the primary sealing element 20 via an elastic element or a sealing rubber to prevent wear of the elastic element or the sealing rubber.

In the activated position, fluid flow is preferably allowed between the primary chamber 4 and the tertiary chamber 8 through the first connection opening 10. For example, a pressure applied to the primary port opening 14 of the primary chamber 4 is transmitted to the tertiary chamber 8 and/or to an inflatable object 54 connected to the tertiary port opening 18. In particular, a fluid can thus flow through the primary chamber 4 and the tertiary chamber 8 into the inflatable object 54.

In FIG. 4, the secondary urging element 24 is positioned in a closed posture in which the primary sealing element 20 abuts with its head 23, which may optionally have an elastic element or sealing rubber, against the second wall 13 around the second connection opening 12 and closes the second connection opening 12 in a substantially fluid-tight manner. The second wall 12 may act as a sealing seat for the secondary sealing element 24.

The pressure applied to the primary chamber 4 and the tertiary chamber 8 via the primary port opening 14 is thus not transmitted to the secondary chamber 6.

The coupling between the primary sealing element 20 and the secondary sealing element 24 may be configured to be detachable. In particular, contrary to a substantially firm connection, the primary sealing element 20 may be substantially non-destructively and/or repeatably detachably coupled to the secondary sealing element 24 via the coupling element 28.

As shown in FIG. 4, the secondary sealing element 24 is in the closed posture and/or abuts against the second wall 13. Further displacement of the secondary sealing element 24 towards the primary sealing element 20 is prevented by the second wall 13.

In order not to prevent or impede further displacement of the primary sealing element 20 into or to the activated position by contraction of the shape memory element 30 despite the secondary sealing element 24 abutting against the second wall 13, the coupling between the sealing elements 20, 24 may advantageously be designed to be detachable.

The coupling is detached upon reaching the closed posture of the secondary sealing element 24, and/or the coupling pin 28 loses the coupling to the primary sealing element 20.

Thereby, the manufacture and/or assembly of the valve 1 is simplified. Alternatively or additionally, a greater manufacturing tolerance of the components of the valve 1 is tolerable.

For the secondary sealing element 24 to be reliably urged into the closed posture and/or retained in the closed posture, in particular during the detachable coupling, when the primary sealing element 20 is in the activated position and/or is displaced to the activated position by the shape memory element 30, the valve 1 may have a secondary urging element 26.

The secondary urging element 26 is preferably configured to press the secondary sealing element 24 against the primary sealing element 20 and/or to establish and/or maintain the coupling therewith.

In particular during the displacement of the primary sealing element 20 from the rest position into the activated position, the coupling of the sealing elements 20, 24 is maintained at least until the secondary sealing element 24 is in the closed posture and/or in contact with the second wall 13. Thereby, despite the detachable coupling between the sealing elements 20, 24, displacement of both sealing elements 20, 24 for opening the first connection opening 10 and closing the second connection opening 12 can be controlled solely by the shape memory element 30.

In the example shown, the secondary urging element 26 comprises a spiral spring which is coupled to the valve housing 2 and the secondary sealing element 24 in such a way as to act on the secondary urging element 26 with a force which displaces the secondary sealing element 24 towards the second wall 13 and/or presses it against the second wall 13. A spiral spring which is arranged around the secondary sealing element 24 enables a particularly compact configuration of the valve 1.

The secondary urging element 26 may alternatively or additionally have a leg spring and/or Belleville spring and/or bending spring and/or another metallic or non-metallic spring element.

Preferably, the secondary urging element 26 is configured to act on the secondary sealing element 24 at any point in time and/or at any position with a force which is less than the force with which the primary urging element 22 acts on the primary sealing element 20 at the same point in time and/or at the same position. Thereby, it can be ensured that the primary sealing element 20 is displaced into the rest position and/or retained in the rest position by the primary urging element 22, despite the secondary urging element 26 acting in the opposite direction to the primary urging element 22.

As shown in particular in FIGS. 3 and 4, the valve 1, in particular its primary sealing element 20, secondary sealing element 24, first connection opening 10 and second connection opening 12, may be arranged such that substantially linear displacement of the sealing elements 20, 24 achieves opening and/or closing of the connection openings 10, 12. Preferably, in particular, the primary sealing element 20, the secondary sealing element 24, the first connection opening 10, the second connection opening 12, the coupling pin 18 and the urging elements 22, 24 are arranged substantially on a common axis.

Such an or a similar arrangement is particularly advantageous, since the complexity of the components can thus be reduced and their assembly facilitated.

In particular, substantially linear and/or rectilinear displacement can be implemented in a reliable and space-saving manner.

Figure 5:
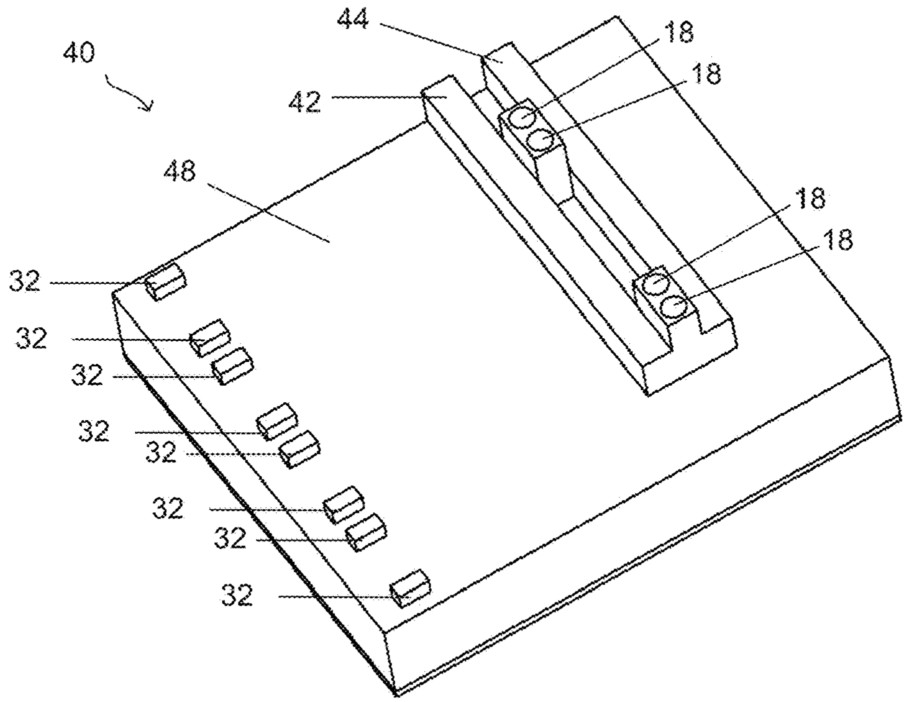
FIG. 5 shows an external view of an exemplary valve stack.

FIG. 5 shows an external view of an exemplary valve stack 40 comprising a plurality of, for example two, three, four, five, six or more, valves 1 as shown in FIGS. 1 to 4.

The exemplary valve stack 40 has an outer housing 48 which forms the valve housing 2 of four valves 1.

The valve stack 40 has two contact means 32 per valve 1, to each of which an electric current and/or an electric voltage can be applied for switching the valves 1, in particular for contracting the respective shape memory elements 30.

As shown, the valve stack 40 may advantageously have a common supply air external port 42 which is connected to the primary port openings 14 of a plurality of the preferably all, valves 1 to transmit a fluid and/or a pressure thereto. Thereby, in particular, the number of hydraulic and/or pneumatic ports can be reduced and/or connection of the valve stack 40 can be facilitated, since only a single fluid line needs to be connected for all primary port openings 14 of the valves 1.

Accordingly, the valve stack 40 may additionally or alternatively have a common exhaust air external port 44 which is connected to the secondary port openings 16 of a plurality of the, preferably all, valves 1 to transmit a pressure thereto. Thereby, in particular, the number of hydraulic and/or pneumatic ports can be reduced and/or connection of the valve stack 40 can be facilitated, since only a single fluid discharge line needs to be connected for all secondary port openings 16 of the valves 1.

Figure 6:
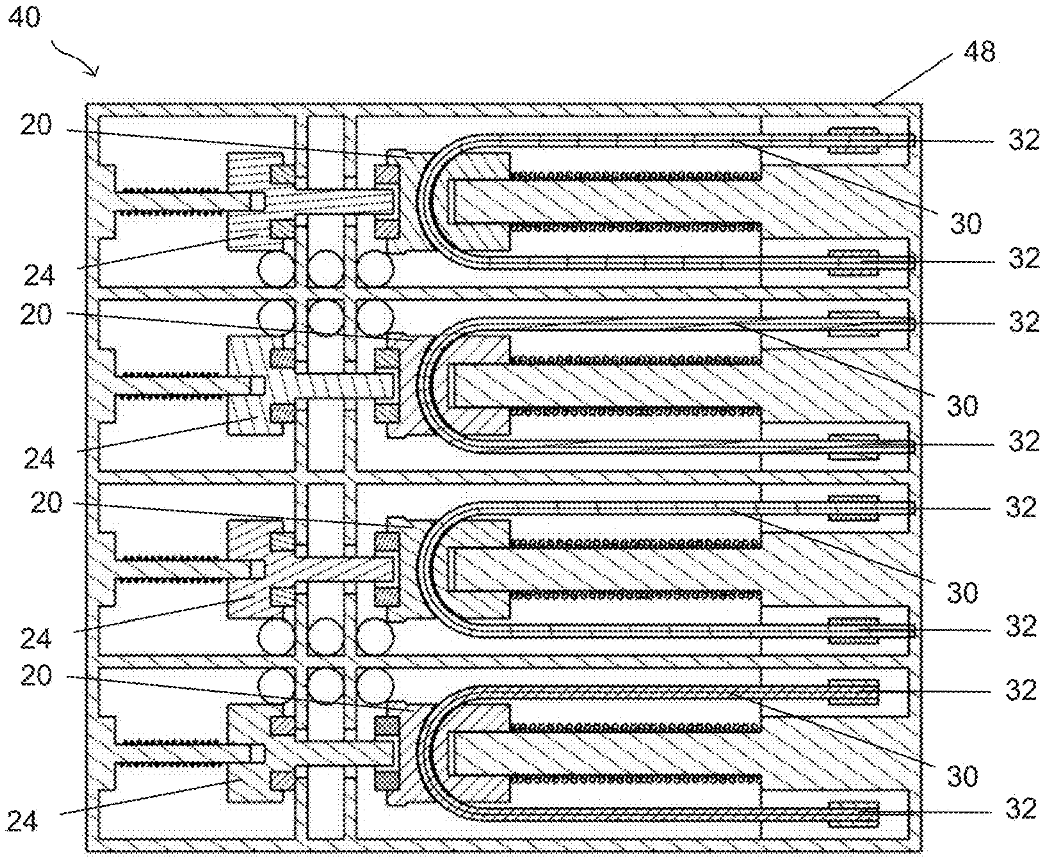
FIG. 6 shows a sectional view of the exemplary valve stack of FIG. 5 with the primary sealing elements in the activated position.

FIG. 6 shows a sectional view of the exemplary valve stack 40 of FIG. 5 with the primary sealing elements 20 of the valves 1 in the activated position, so that a pressure applied in the respective primary chambers 4 also prevails in the respective tertiary chambers 8 and vice versa.

In the state shown, a fluid flow from the respective primary chambers 4 to the respective tertiary chambers 8 and vice versa is allowed in all valves 1.

Although all valves 1 of the valve stack 40 in FIG. 6 have the same switching state, it is emphasized that the valves 1 can be switched individually, since each of the valves 1 has separately contactable and/or actuatable contact means 32.

Figure 7:
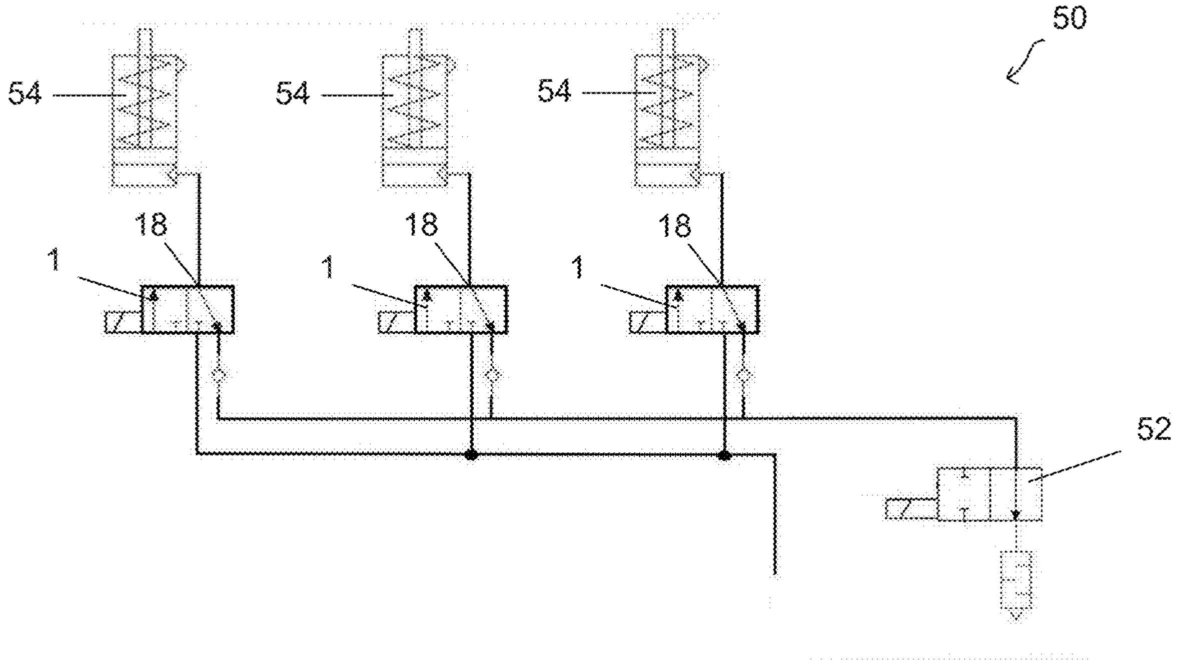
FIG. 7 shows a schematic of an exemplary valve system having an external valve.

However, if it is desired, as shown in FIG. 7, to switch one or more valves 1 of the valve stack 40 substantially synchronously and/or identically, multiple master contact means may be provided, wherein one of the master contact means electrically connects one contact means 32 of two or more valves 1 and another master contact means electrically connects the respective other contact means 32 of the two or more valves 1. By actuating the master contact means, all connected valves 1 can be switched substantially simultaneously and/or uniformly.

In any case, the number of contact connections to be connected can be reduced by electrically coupling a respective one of the contact means 32 of all valves 1 to each other and operating them at a common potential, for example GND. In order to actuate the individual valves 1, a potential different from the common potential may be applied to the respective other contact means 32 to apply a current flow to the associated shape memory element 30 and generate a contraction.

FIG. 7 shows a schematic of an exemplary valve system 50 having a common external valve 52 which is fluidically connected to the primary port openings 14 or to the secondary port openings 16 of a plurality, preferably each, of the valves 1 of the valve system 50.

The external valve 52 is configured to control a fluid flow through the connected primary port openings 14 or secondary port openings 16 of the valves 1.

In particular, the external valve 52 extends the function of the valves 1 and/or the valve stack 40, since it additionally enables the function of maintaining a pressure in the primary chamber 4 or the secondary chamber 6 as well as substantially simultaneous pressure equalization in the primary chambers 4 or secondary chambers 6.

This is particularly advantageous in connection with a valve 1 according to the present invention, since the latter does not have a function with a closed first connection opening 10 and a simultaneously closed second connection opening 12.

Such a valve system 50 is configured, for example, by applying a positive pressure to the primary or secondary port openings 14/16, to inflate inflatable objects 54 individually and/or separately by switching the associated valves 1 accordingly. As long as the external valve 52, which is connected to the port openings 14/16 to which no positive pressure is applied, is closed, the inflatable objects 54 maintain the inflated state, even when the inflatable objects 54 are no longer fluidically connected to the positive pressure. Only when the external valve 52 is opened, the positive pressure in the inflatable objects 54 is relieved and they lose their inflated state.

An opposite function can also be performed with such a valve system 50, i.e. pressurizing the inflatable objects 54 together with positive pressure by opening the external valve 52, maintaining the positive pressure with the external valve 52 closed and individually and/or separately releasing the positive pressure from the inflatable objects 54 by switching the individual valves 1 accordingly.

What is claimed is:

1. A valve for controlling a fluid comprising:

a valve housing including:

a primary chamber, a secondary chamber and a tertiary chamber, wherein the primary chamber and the tertiary chamber are fluidically connected by a first connection opening and wherein the secondary chamber and the tertiary chamber are fluidically connected by a second connection opening; and a primary port opening formed in the primary chamber, a secondary port opening formed in the secondary chamber and a tertiary port opening formed in the tertiary chamber;

a primary sealing element which is arranged displaceably in the valve housing between a rest position, in which the primary sealing element closes the first connection opening, and an activated position, in which the primary sealing element releases the first connection opening;

a primary urging element which is coupled to the primary sealing element to urge the primary sealing element towards the rest position;

a shape memory element which is coupled to the primary sealing element and the valve housing such that application of an electric current to the shape memory element causes displacement of the primary sealing element from the rest position into the activated position; and a secondary sealing element which is arranged displaceably in the valve housing between a closed posture, in which the secondary sealing element closes the second connection opening, and an open posture, in which the secondary sealing element releases the second connection opening;

wherein the secondary sealing element is mechanically coupled to the primary sealing element such that upon displacement of the primary sealing element from the activated position into the rest position, the secondary sealing element is displaced from the closed posture into the open posture; and wherein the secondary sealing element is non-destructively and/or reversibly detachably coupled to the primary sealing element, wherein the secondary sealing element is decoupled from the primary sealing element when the secondary sealing element is in the closed posture.

2. The valve according to claim 1, wherein the primary sealing element is linearly and/or translationally displaceable from the rest position into the activated position, and/or wherein the secondary sealing element is linearly and/or translationally displaceable into the closed posture.

3. The valve according to claim 1, further comprising:

a secondary urging element which is coupled to the secondary sealing element to urge the secondary sealing element towards the closed posture.

4. The valve according to claim 1, further comprising:

a coupling element for mechanically coupling the primary sealing element and the secondary sealing element, wherein the coupling element is configured to:

transmit linear and/or translational displacement of the primary sealing element to the secondary sealing element; and/or transmit linear and/or translational displacement of the secondary sealing element to the primary sealing element.

5. The valve according to claim 4, wherein the coupling element is configured as a coupling pin of the primary sealing element which is arranged in the valve housing in a manner passing through the first connection opening and through the second connection opening.

6. The valve according to claim 4, wherein the coupling element is configured as a coupling pin of the secondary sealing element which is arranged in the valve housing in a manner passing through the first connection opening and through the second connection opening.

7. The valve according to claim 1, wherein the shape memory element has a wire having or made of a shape memory alloy, and/or wherein the shape memory element is configured to contract and/or shorten upon application of an electric current in such a way as to displace the primary sealing element from the rest position into the activated position.

8. A valve stack comprising two or more valves according to claim 1.

9. A valve system comprising:

a valve according to claim 1; and an external valve which is fluidically connected to the primary port opening or to the secondary port opening of the valve and is configured to control a fluid flow through the fluidically connected port opening of the valve.

10. A valve system comprising:

a plurality of valves according to claim 1; and an external valve which is fluidically connected to the primary port openings or the secondary port openings of the plurality of valves and is configured to control the fluid flows through the fluidically connected port openings of the plurality of valves.

* * * * *